(12) United States Patent
Krutik (10) Patent No.: US 7,643,819 B2
(45) Date of Patent: Jan. 5, 2010

(54) TEMPLATE BASED MESSAGING

(75) Inventor: Vladislav V. Krutik, San Diego, CA (US)

(73) Assignee: Motorola, Inc., Schaumburg, IL (US)

( * ) Notice: Subject to any disclaimer, the term of this patent is extended or adjusted under 35 U.S.C. 154(b) by 543 days.

(21) Appl. No.: 11/426,636

(22) Filed: Jun. 27, 2006

(65) Prior Publication Data
US 2007/0298818 A1    Dec. 27, 2007

(51) Int. Cl.
*H04M 1/725* (2006.01)
(52) U.S. Cl. ............... 455/412.1; 455/412.2; 455/414.1; 455/466; 455/566; 370/328; 370/338
(58) Field of Classification Search ............... 455/412.1, 455/412.2, 414.1, 466, 566; 370/328, 338
See application file for complete search history.

(56) References Cited

U.S. PATENT DOCUMENTS

2007/0135097 A1 * 6/2007 Rahkonen ............... 455/412.1

* cited by examiner

*Primary Examiner*—Nghi H Ly
(74) *Attorney, Agent, or Firm*—Philip H. Burrus, IV (57) ABSTRACT

A portable electronic device (300) having a message service application (303) for rapidly completing asynchronous messages is provided. The message service application (303) is configured to present partially completed message service messages (601) on a display (307) of the portable electronic device (300) to a user. The partially completed message service messages (601) include a plurality of populated segments (602,603) and a plurality of tab accessible fields (604, 605,606,607). The plurality of tab accessible fields (604,605, 606,607) is interlaced among the populated segments (602, 603). By actuating a tab key (306), a user may jump from tab accessible field to tab accessible field, populating each field rather than completely composing an original message. The tab accessible fields (604,605,606,607) may be populated with text, pictures, video, or audio. The user may populate the tab accessible fields (604,605,606,607) either by a user interface (304) or by way of a data retrieval module (314) that retrieves objects for insertion from memory (302).

20 Claims, 9 Drawing Sheets

TEMPLATE BASED MESSAGING

BACKGROUND

1. Technical Field

This invention relates generally to electronically transmitted messaging systems, and more specifically to a method and system employing partially completed messages to expedite generation of messages for transmission.

2. Background Art

Modern mobile telephones support a wide variety of communication services. In addition to supporting traditional voice calls, these devices are often also capable of transmitting short messages, pictures, and videos. These messaging services, known as "asynchronous communications", allow people to transmit information regardless of another's availability. For example, if person A needs to get information to person B while person B is in a meeting, rather than making a call, person A may simply transmit a message to person B. Person B may then read the message during, or after, the meeting.

One problem associated with messaging applications on mobile telephones is that it is sometimes difficult and time consuming to enter text. This problem stems from the traditional telephone keypad. Having only numeric keys, i.e. keys 1 through 9, 0, pound, and star, there are not enough keys for the twenty-six characters of the English alphabet. (The problem can be compounded in other languages with more alphabetic characters and symbols.) Consequently, single keys must be used for multiple letters. To further compound matters, the various punctuation marks, such as commas, periods, dashes, semicolons, and quotation marks, are often assigned to only one or two keys.

By way of example, consider one exemplary prior art system: the number 2 key is used for the letters a, b, c, and the number 2, the number 3 key is used for letters d, e, f, and the number 3, and so forth. To enter a "b" for instance, the user taps the 2-key twice and waits for a cursor to move to the next character position. All punctuation characters, as well as the numbers 0 and 1, are entered with the 1 key, and spaces are entered with the star key. In such a system, to type the message, "Hi Mom, I'll be there in 10 minutes.", a user must tap 4-4, 4-4-4, star, 6, 6-6-6, 6, 1-1-1-1, 4-4-4, 1-1-1-1-1-1-1, 5-5-5, 5-5-5, star, 2-2, 8, 4-4, 3-3, 7-7-7-7, 3-3, star, 4-4-4, 6-6, star, 1-1-1-1-1-1-1-1-1-1-1, 1-1-1-1-1-1-1-1-1-1-1, star, 6, 4-4-4, 6-6, 8-8, 8, 3-3, 7-7-7-7, 1. This is time consuming, in that the user must press over ninety keys to enter less than forty characters. Where the user is sending a message many times, such as "Happy New Year, Buster," followed by "Happy New Year, Holley," he may have to enter the message many times. Each entry requires the same time-consuming data entry.

One solution to this "too few keys for all the letters, numbers, and punctuation marks" problem is to manufacture mobile telephones having full alphanumeric keypads. While this may solve the problem for some, for many this solution still has problems. First, mobile communication devices with full keyboards are often more expensive due to the increased cost of the keypad and associated processing circuitry. The service plans available for these devices is also generally more expensive. Second, these full-keyboard devices are generally physically bigger than are devices with standard keypads. For a user who seldom sends text messages, the extra bulk may not be desirable.

There is thus a need for an improved method and system for transmitting messages having more efficient message creation capabilities.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to provide a template based messaging system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of providing a template based messaging system as described herein. The non-processor circuits may include, but are not limited to, a radio receiver, a radio transmitter, signal drivers, clock circuits, power source circuits, and user input devices. As such, functions may be interpreted as steps of a method to perform template based messaging in accordance with the invention. Alternatively, some or all functions could be implemented by a state machine that has no stored program instructions, or in one or more application specific integrated circuits, in which each function or some combinations of certain of the functions are implemented as custom logic. Of course, a combination of these approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and circuits with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Figure 1:
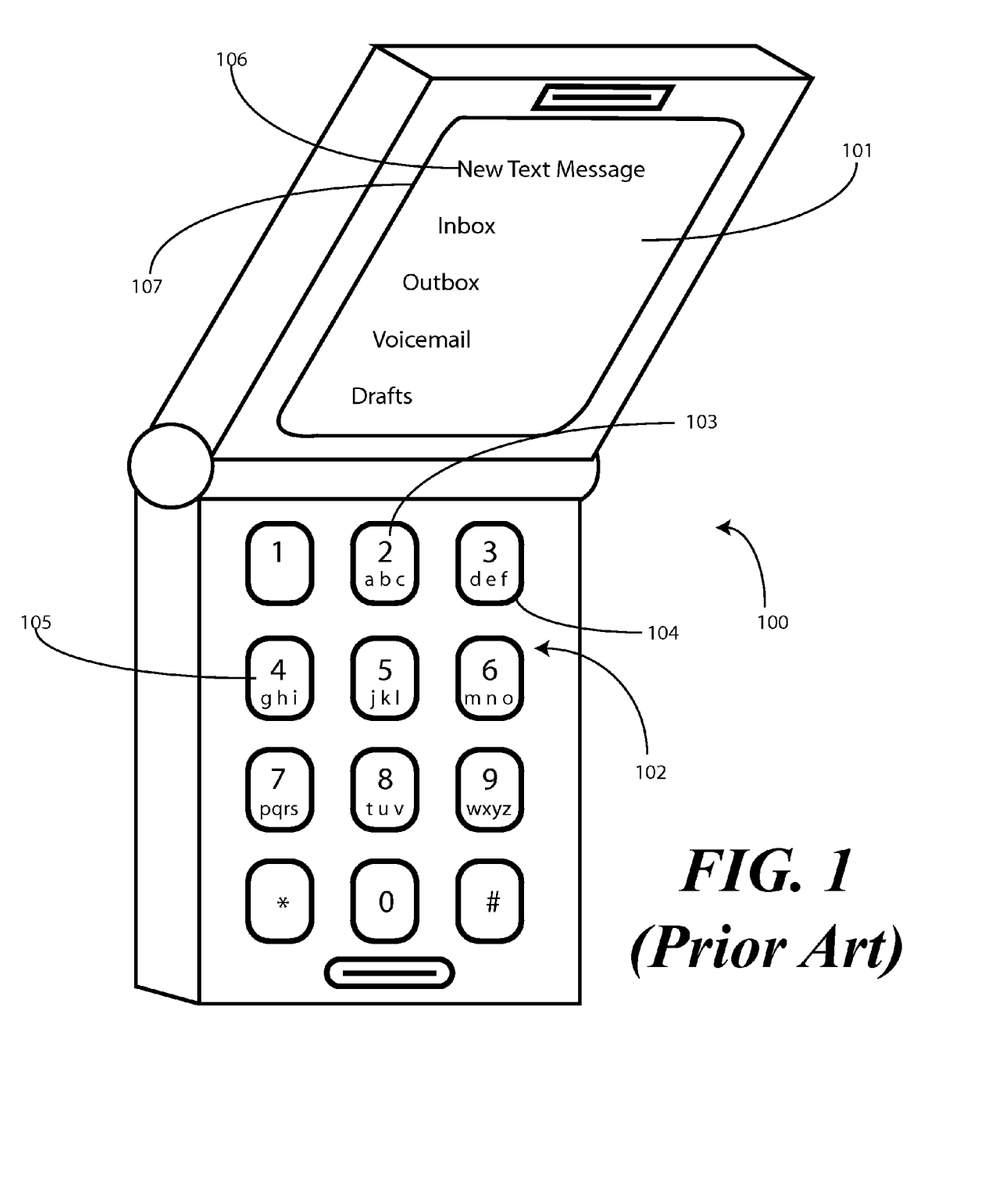
FIG. 1 illustrates a prior art mobile telephone with text message capabilities.

Turning now to FIG. 1, illustrated therein is a prior art mobile telephone 100 having messaging capabilities, such as the Short Message Service. The mobile telephone 100 includes a messaging menu 101 that allows a user to create and read messages. The user enters text by pressing keys on the keypad 102. Since this mobile telephone 100 includes a standard 12-digit telephone keypad, the various number keys are used for letters. For example, the 2-key 103 is used for the letters a, b, and c. The 3-key 104 is used for the letters d, e, and f. The 4-key 105 is used for letters g, h, and i, and so forth. A user creates a message by selecting the "new text message" entry 106 from the menu 101 shown on the display 107.

Figure 2:
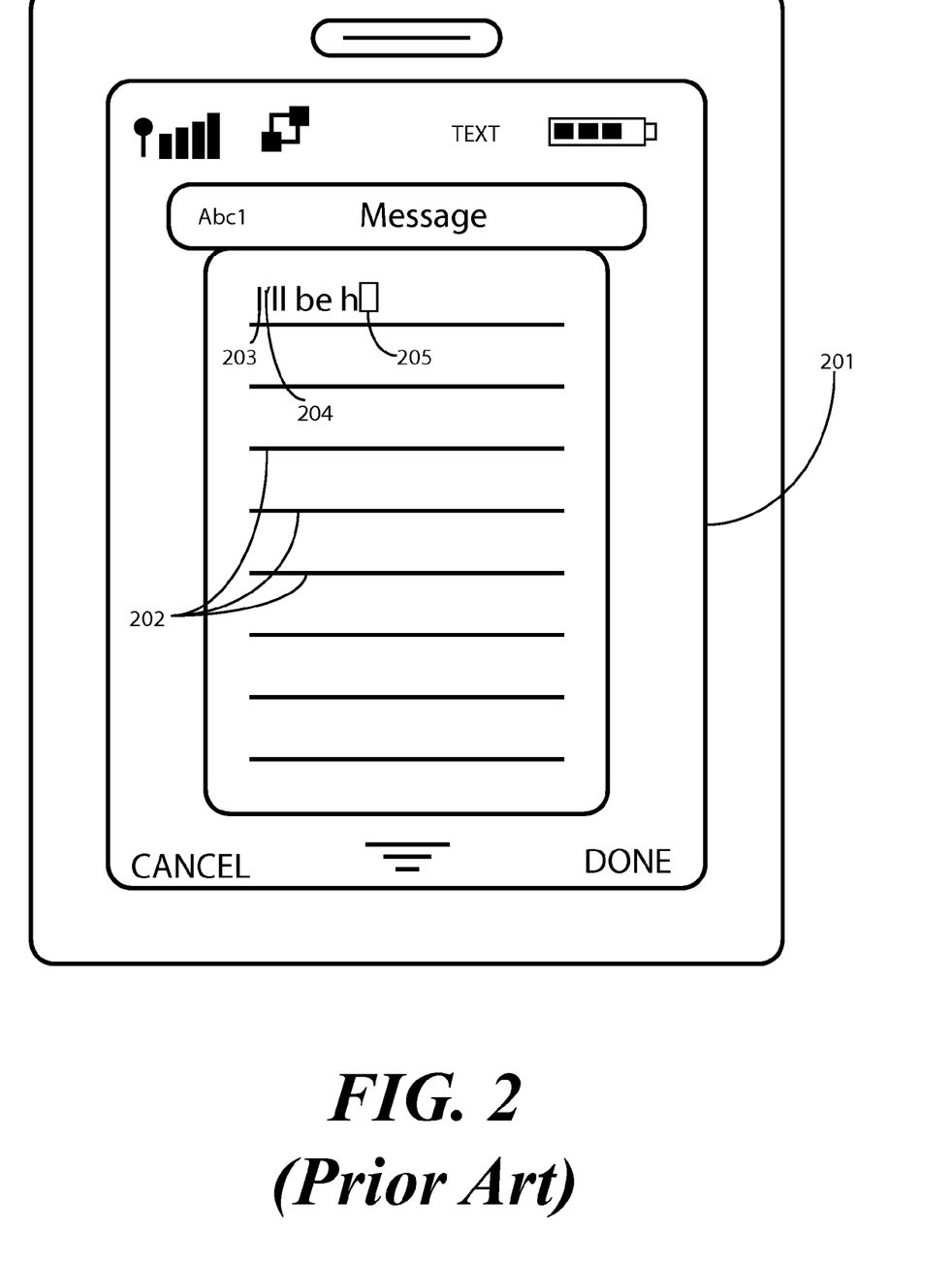
FIG. 2 illustrates a prior art messaging application where characters are entered one letter at a time.

Turning now to FIG. 2, illustrated therein is a prior art message creation field 201 that appears on a display 107 when the "new text message" entry (106) is selected from the menu (101). The message creation field 201 has a series of lines 202 resembling the lines on a page of notebook paper. The user enters text by pressing the 12-digit keypad (102) in various combinations.

By way of example, the capital letter "I" may be entered by pressing the 4-key (105) three times, and the star key once. This pressing of the 4-key causes the lower-case "i" to appear, while the pressing of the star key works as a shift, causing the lower-case to become capitalized. The apostrophe may be entered by pressing the 1-key a number of times. Each time the 1-key is pressed, a different punctuation mark appears. The user stops pressing the 1-key when the desired punctuation mark appears.

After each desired character appears, the user then waits for a cursor 205 to jump to the next spot. This waiting causes delay in message creation. For example, if a user wishes to type the word "hi", the 4-key (105) is used for both h and i. Thus, the user presses the 4-key (105) twice for an h, and three times for an i. If the user starts to enter the i before the cursor 205 moves, the h will continue to change. Such a data entry process, while ultimately effective, is slow and laborious.

Figure 3:
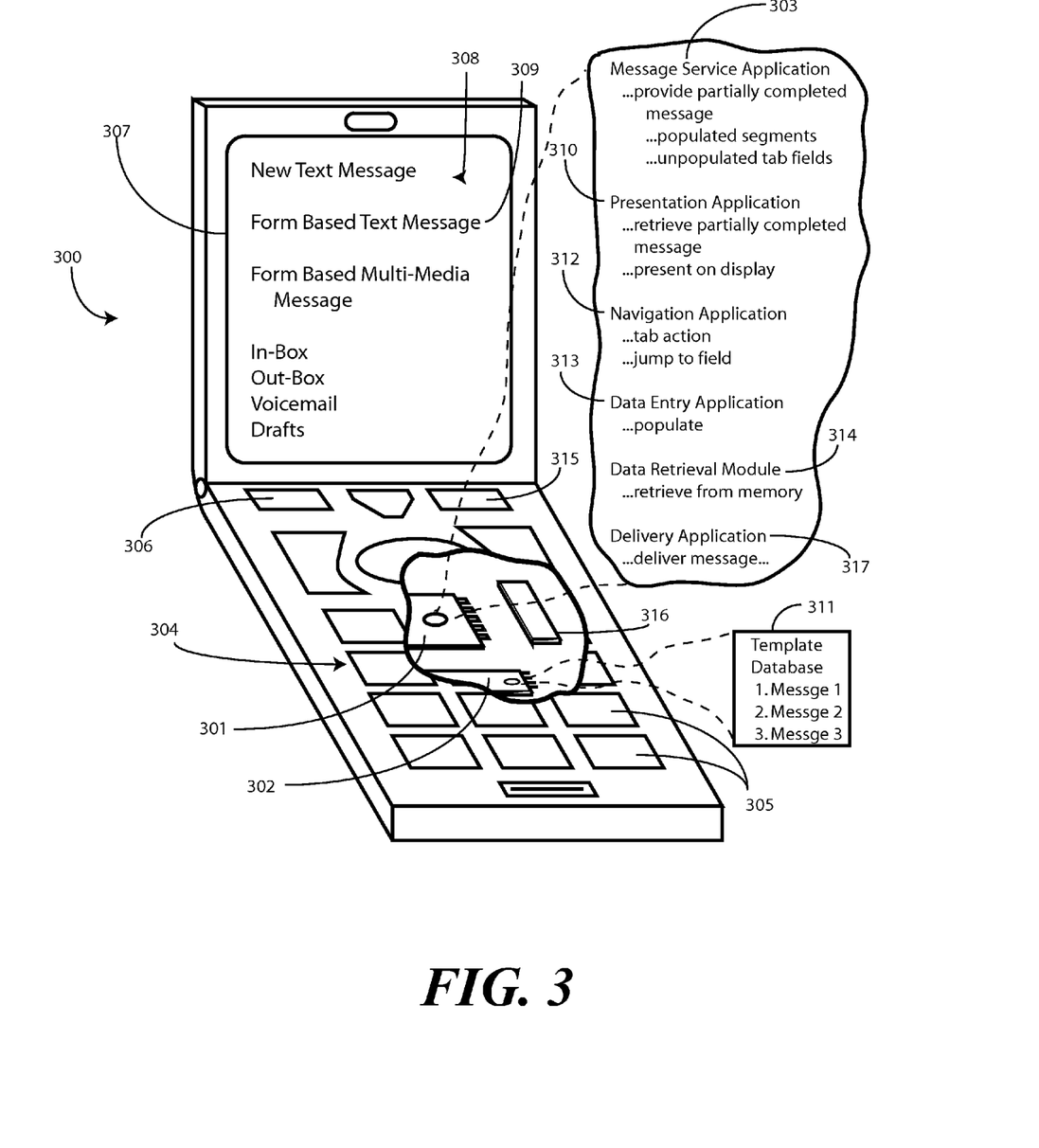
FIG. 3 illustrates one embodiment of a mobile telephone having template based messaging in accordance with the invention.

Turning now to FIG. 3, illustrated therein is one embodiment of a portable electronic device 300 configured to send and receive message service messages in accordance with the invention. For convenience, the exemplary portable electronic device 300 described herein will be a mobile telephone. It will be clear to those of ordinary skill in the art having the benefit of this disclosure, however, that the invention is not so limited. Numerous other portable electronic devices may employ the invention, including gaming devices, portable music players, personal digital assistants, two-way radios, pagers, and video players.

The portable electronic device 300 includes a processor 301 and associated memory 302. While microcontrollers are commonly used as the processor 301 due to the relatively low cost and high degree of configurability, other devices capable of executing an instruction set may also be employed. The associated memory 302, which may include both static and dynamic memory components, may be used for storing both embedded code for the processor and user data.

A message service application 303 is operable with the processor 301 for sending and receiving asynchronous messages. In one embodiment, the message service application 303 is embedded firmware code operable with the processor 301 having a set of instructions for the processor 301 to execute the steps of creating, presenting, storing, sending, and receiving messages. As will be described below, the message service application 303 of the present invention expedites the message creation process by presenting partially completed messages to the user. These partially completed messages have a set of tab-accessible fields disposed therein. To complete a message, the user may simply jump to the tab-accessible fields, complete those fields, and then send the message. For example, if a person wanted to send ten messages saying "Happy New Year ______," with the ______ being a tab-accessible field, the user would only need to enter the name, rather than constructing the entire message ten times.

The portable electronic device 300 includes a user interface 304 with which the user may enter data. In one embodiment, the user interface includes at least one data entry key 305 and at least one tab key 306. The data entry key 305 may be one key of a 12-digit numeric keypad, with number keys corresponding to a plurality of letters as described above. The tab key 306 may be either a dedicated key or a "soft key". A soft key is a key beneath the display 307 where the soft key's function changes depending upon the particular display. For example, when a telephone call is incoming, a single soft key may operate as an answer key, while the same soft key may operate as a send message button when the messaging application is actuated. Functions of soft keys are often indicated on the display 307.

When the portable electronic device 300 is in the message service mode, a menu 308 of options may be presented on the display 307. In one embodiment of the invention, the message service application presents a partially completed, tab field delimited message to the user for completion. An option 309 on the menu 308 for selecting this feature is shown in FIG. 3.

In one embodiment, in addition to the message service application 303, other modules are also included. These additional modules may also be embedded firmware instruction sets for the processor 301. While the functionality of the various modules will be explained in more detail below, a brief description and identification is included here with FIG. 3. For instance, one module that may be included is the presentation application 310.

The presentation application 310 is configured, upon receipt of information from the user interface 304, to retrieve a selected partially completed message service message from a message service template database 311. The message service template database 311 is a section of memory used to store partially completed message service messages having tab accessible fields interlaced among a plurality of populated segments. Upon retrieving the partially completed message service message from the message service template database 311, the presentation application 310 presents the selected message on the display 307. The user may then jump to, and populate, the various tab accessible fields to complete the message. Additionally, the user may edit, add to, or delete from the predetermined segments as well.

A navigation application 312 may additionally be included. The navigation application 312 is operable with the processor 301 and responds to commands from the tab key 306. Upon receipt of a tab command, e.g. when the user presses the tab key 306, the navigation application causes a cursor on the display 307 to move to one of the plurality of tab accessible fields. This movement allows a user to jump between tab accessible fields while completing the message.

A data entry application 313 may also be included. The data entry application 313 is operable with the processor 301 and responds to commands from any of the data entry keys 305. Upon receipt of a data command, e.g. when a user presses a data entry key 305, the data entry application populates a cursor location with data. For example, if a user has moved to a specific tab accessible field, upon actuation of a data entry key 305, the data entry application 313 will begin populating that particular tab accessible field. The population of the tab accessible field serves to create a populated message service message.

Note that data entry by data entry keys 305 is not the only way to populate tab accessible fields in accordance with the invention. In one embodiment, a user is able to retrieve objects stored in memory 302, such as pictures, predetermined text, audio, video, address book entries, and other types of data. In such an embodiment, the data entry application 313 may also comprise a data retrieval module 314. The data retrieval module 314, operable with the processor 301, is responsive to an insert key 315, which like the tab key 306 may be a soft key within the message service application environment. Upon receipt of an insert command from the user interface 304, e.g. when a user presses the insert key 315, the data retrieval module 314 retrieves an object disposed within memory 302 of the portable electronic device 300 and inserts the object into one of the tab accessible fields. Thus, rather than entering the data in the field with the data entry keys 305, a user may simply insert data with the insert key 315. This is useful, for example, when writing a message to a contact stored in an address book. Rather than typing the name, a user may employ the insert key 315 and data retrieval module 314 to simply insert the name from the address book.

Note that while the tab key 306, insert key 315, and data entry keys 305 have been thus described as physical keys on the portable electronic device 300, it will be clear those of ordinary skill in the art having the benefit of this disclosure that the invention is not so limited. While in one embodiment keys may be used, in other embodiments voice recognition, handwriting recognition, and other equivalent data entry mechanisms may also be employed.

Once a message has been completed, the message service application 303 transmits the message through a communication circuit 316. The communication circuit 316 may also be used to receive messages. The communication circuit 316, which may be one of a receiver or transmitter, and may alternatively be a transceiver, operates in conjunction with the processor 301 to electronically transmit messages through a predetermined communication network. Examples of such include Wi-Fi, CDMA, TDMA, GSM, Bluetooth, and IEEE 802.11 communication protocols with either wide area networks or local area networks.

A delivery application 317, operable with the processor 301, is responsive to the user interface 304. When a user has populated at least one of the tab accessible fields, and where the user enters a send command, the delivery application delivers the populated message service message to the communication circuit 316 for transmission to its destination.

Figure 4:
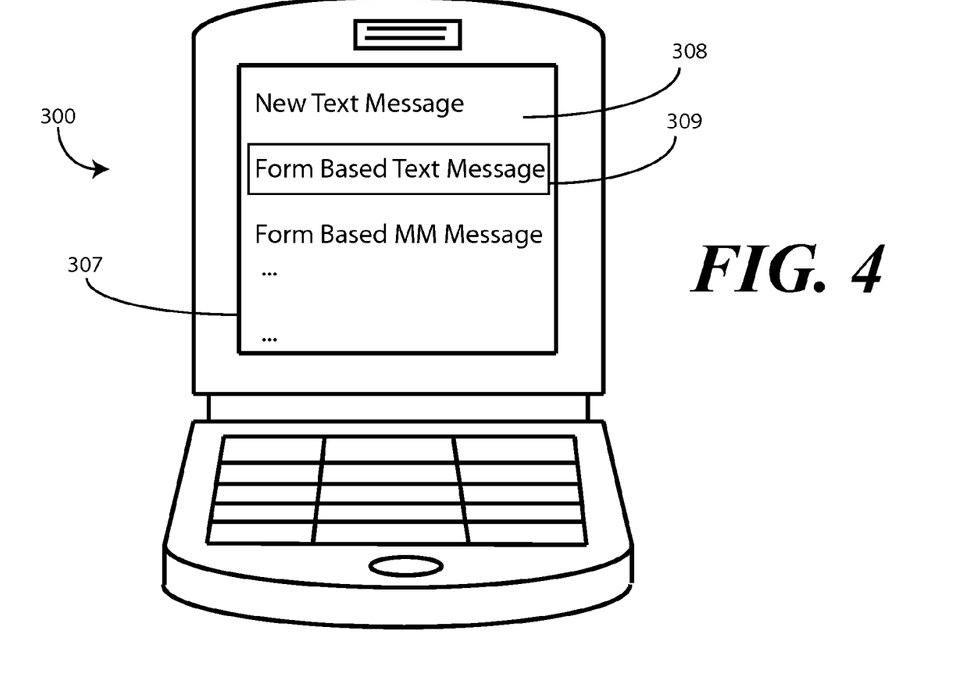
FIG. 4 illustrates an exemplary first screen shot of a mobile telephone having template based messaging in accordance with the invention.

Turning now to FIG. 4, the operation of the various modules and functions will be described in more detail. FIG. 4 illustrates a screenshot of the portable electronic device 300 with the message service application (303) actuated. A menu 308 of options for creating messages is presented on the display by the presentation application (310). As noted above, one embodiment of a portable electronic device 300 in accordance with the invention is that of a mobile telephone. A message service application (303) accompanying such a device may therefore include a variety of different types of partially completed messages having tab accessible fields. As such, the message service application (303) may be any of a short message service application for sending text messages, a multimedia message service application for sending messages including pictures, audio, or video, an instant messaging application, and an e-mail messaging service application.

In the view of FIG. 4, the user has highlighted one option 309 called "form based short message service" message creation. By pressing a key on the user interface (304), which may be a soft key, the user selects form based short message service message creation to activate one embodiment of the invention.

Figure 5:
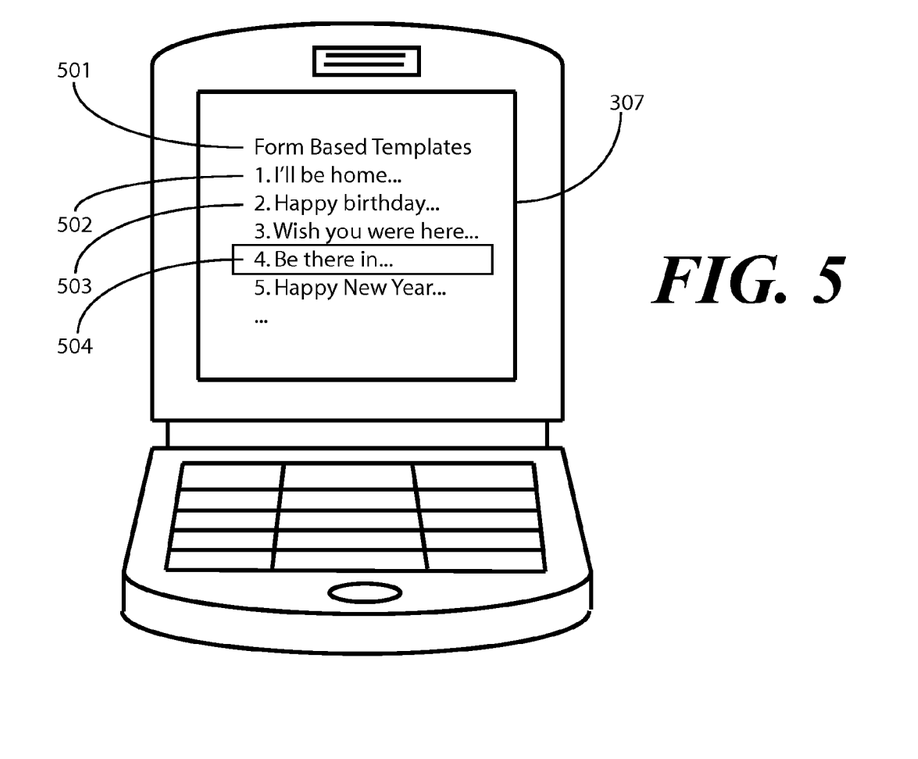
FIG. 5 illustrates an exemplary second screen shot of a mobile telephone having template based messaging in accordance with the invention.

In accordance with one embodiment of the invention, the message service application (303) is configured to provide a partially competed message service message to the user. Turning now to FIG. 5, illustrated therein is a screenshot of one exemplary list of partially completed messages presented on the display 307. As the user selected a text messaging application in FIG. 4, a list 501 of various partially completed messages 502,503,504 is presented on the display 307 in FIG. 5. Such messages 502,503,504 may be retrieved by the presentation application (310) from the message service template database (311).

For instance, one partially completed message 502 may read, "I'll be home at <tab 1>, love <tab2>." Another message 503 may read, "Happy Birthday, <tab1>! From <tab2>." In FIG. 5, the user has highlighted message 504, which reads, "Hello, <tab1>. I'll be arriving at <tab2>in <tab3>minutes. See you then! From <tab4>." The user selects this highlighted message 504 with the user interface (304).

Figure 6:
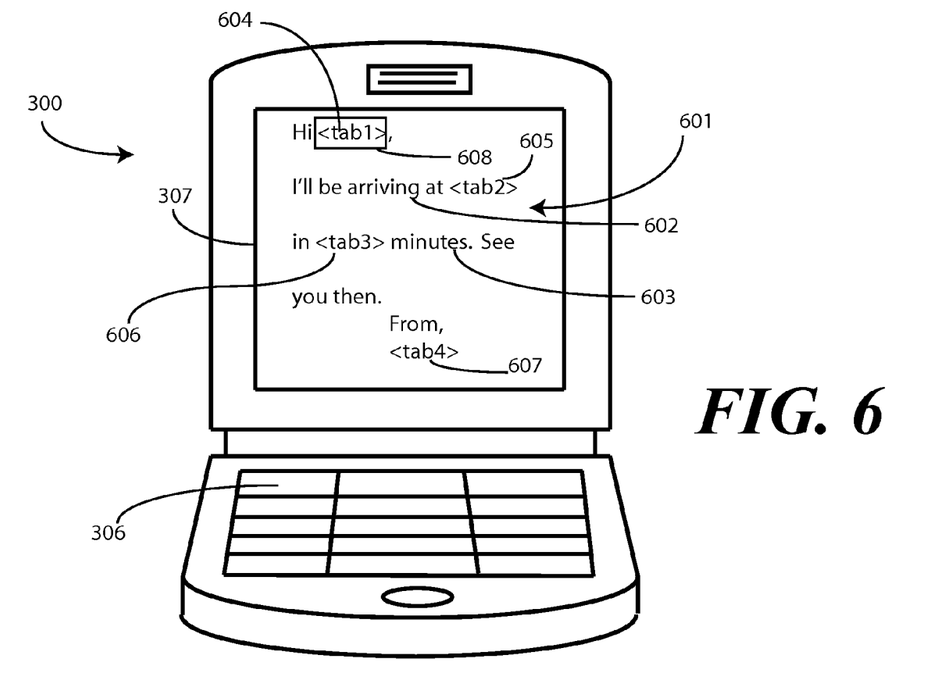
FIG. 6 illustrates an exemplary third screen shot of a mobile telephone having template based messaging in accordance with the invention.

Turning now to FIG. 6, illustrated therein is a screenshot of a portable electronic device 300 having a partially completed message service message 601 presented on the display 307. The partially completed message service message 601 includes a plurality of populated segments 602,603 and a plurality of tab accessible fields 604,605,606,607. The tab accessible fields 604,605,606,607 are interlaced among the plurality of populated segments 602,603.

When the partially completed message service message 601 is initially presented up on the display, the tab accessible fields 604,605,606,607 are unpopulated. A cursor 608 indicates which of the tab accessible fields 604,605,606,607 is available for editing. For example, in FIG. 6, the cursor 608 highlights tab accessible field 604, indicating that it may be edited. The message service application (303) accesses the tab accessible fields 604,605,606,607 by causing the cursor 608 to move to one of the tab accessible fields, e.g. tab accessible field 604. The user moves between the tab accessible fields 604,605,606,607 with the tab key 306. Data entry keys (305) may be used to populate the various tab accessible fields 604,605,606,607. The data entry keys (305) may also be used to edit the plurality of populated segments 602,603, for example where a user wishes to alter the partially completed message service message text.

As the partially completed message shown in FIG. 6, is a text message, the tab accessible fields 604,605,606,607 will be populated with text. Other message types, however, may be populated in other ways. For example, a multimedia partially completed message may include tab accessible fields capable of being populated with any of text, such as a predetermined text segment, pictures or image files, audio content or sound files, or video content or video files.

Figure 7:
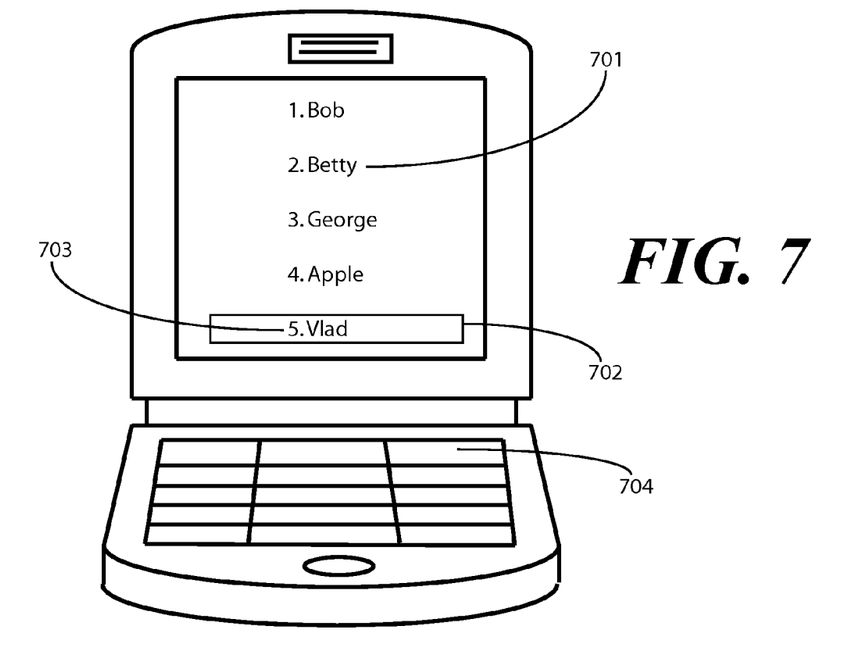
FIG. 7 illustrates an exemplary fourth screen shot of a mobile telephone having template based messaging in accordance with the invention.

The first tab accessible field 604 in the exemplary partially completed message service message 601 of FIG. 6 is most likely going to be populated with an addressee's name. The user may enter the name directly by way of the user interface (304). Thus, upon actuation of a data entry key (305), the message service application (303) populates one of the tab accessible fields 604,605,606,607. In another embodiment of the invention, the user is able to insert an object by way of the data retrieval module (314). Turning now to FIG. 7, illustrated therein is a screen shot of such an insertion.

In FIG. 7, the data retrieval module 314 has retrieved a list 701 of names from an address book disposed within the memory (302) of the portable electronic device (300). The user moves an insertion cursor 702 to the desired object 703. Then the user may insert the object 703 by pressing an insert key 704, which may be a soft key in the user interface (304). Upon actuation of the insert key 704, the message service application (303) retrieves the object 703 from the memory (302) and inserts the object 703 into one of the tab accessible fields 604,605,606,607.

Figure 10:
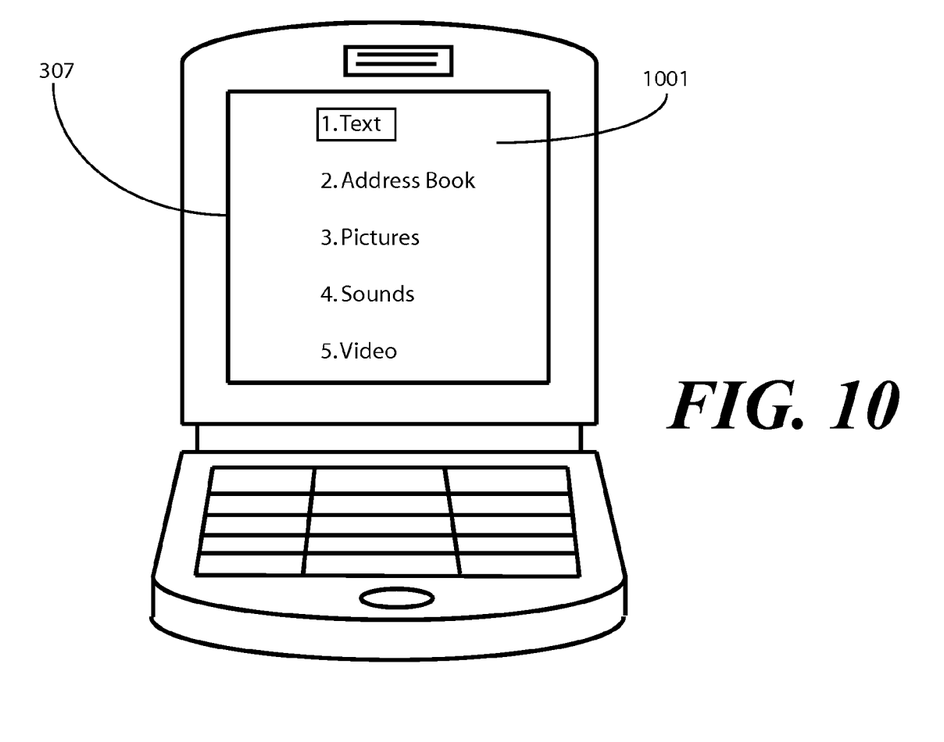
FIG. 10 illustrates an exemplary eighth screen shot of a mobile telephone having template based messaging in accordance with the invention.

As noted above, the object 703 can be text, video, audio, or other forms of content. Turning briefly to FIG. 10, illustrated therein is an intermediate menu 1001 that may be presented to a user on the display 307 between the screenshot of FIG. 6 and the screenshot of FIG. 7. In FIG. 10, the user may select what type of object is to be inserted. Thus, the message service application (303) is able to determine which type of object to select, be it text, picture, audio content, video content, or other object.

Figure 8:
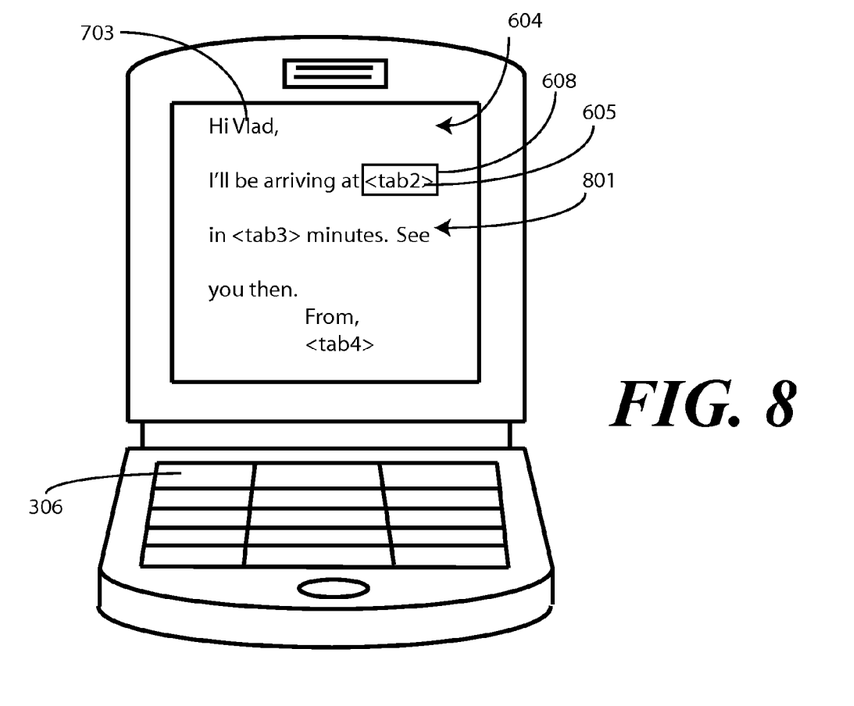
FIG. 8 illustrates an exemplary fifth screen shot of a mobile telephone having template based messaging in accordance with the invention.

Turning now to FIG. 8, the completion of this insertion action may be seen. The object 703 has been inserted into the partially completed message service message, thereby creating a populated message service message 801. By pressing the tab key 306, the user may jump to the next tab accessible field to continue completion of the populated message service message 801. In one embodiment, the message service application (303) accesses each of the plurality of tab accessible fields sequentially, such that when the tab key 306 is actuated, the message service application (303) causes the cursor 608 to move from a first tab accessible field 604 to a second tab accessible field 605.

Figure 9:
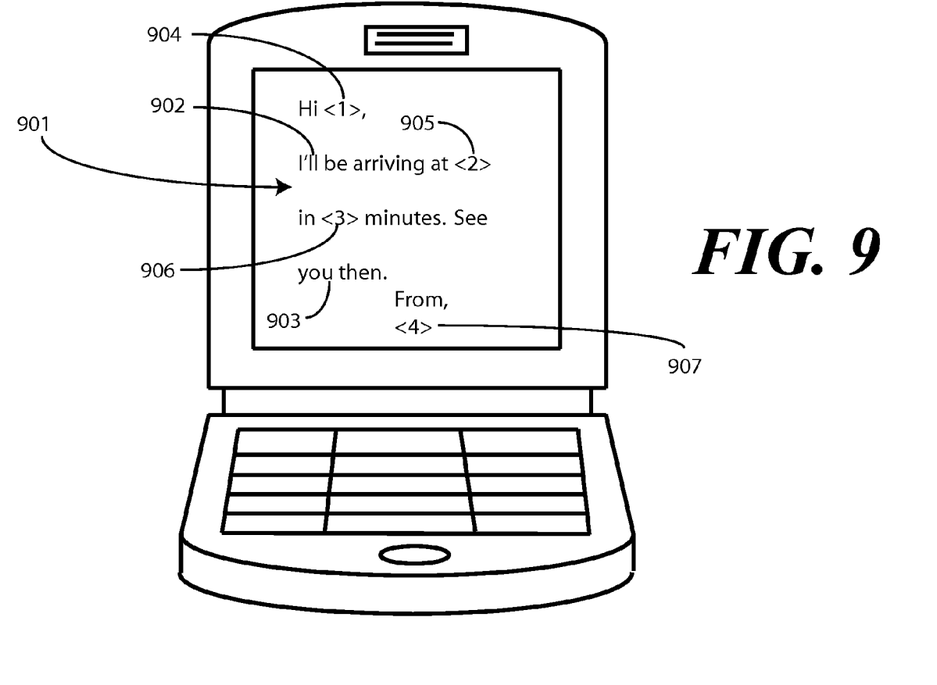
FIG. 9 illustrates an exemplary seventh screen shot of a mobile telephone having template based messaging in accordance with the invention.

Turning now to FIG. 9, illustrated therein is an alternate partially completed message service message 901 having tab accessible fields 904,905,906,907 interlaced among partially populated segments 902,903. In the embodiment of FIG. 9, rather than accessing the tab accessible fields 904,905,906, 907 sequentially, the user may directly jump to any of the tab accessible fields 904,905,906,907 directly.

In such an embodiment, the user interface effectively includes a plurality of tab keys, as each data entry key (305) may also serve as a tab key. Upon actuation of a first tab key, the message service application (303) causes the cursor to move to a tab accessible field corresponding to the first tab key. By way of example, a user may jump to tab accessible field 903 by pressing the 3-key on the user interface (304).

Figure 11:
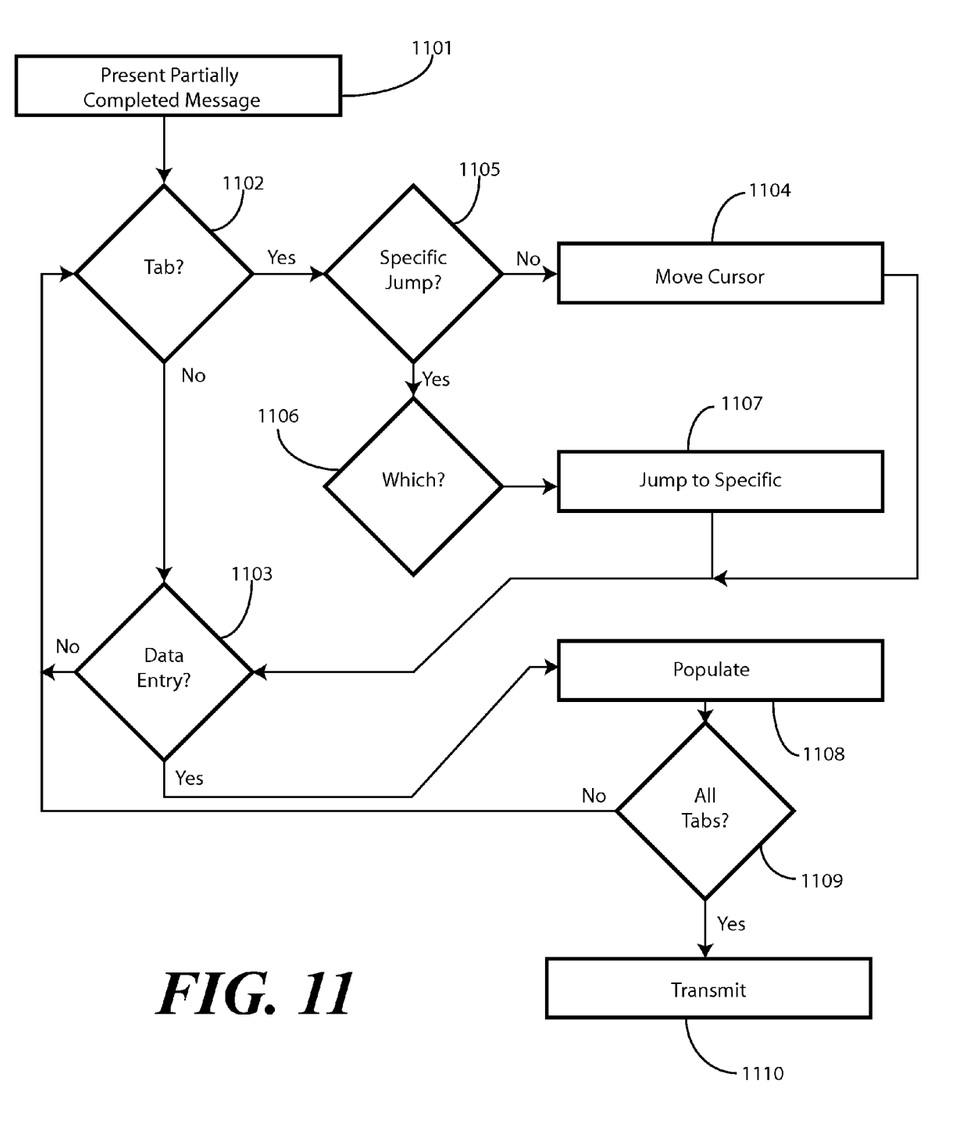
FIG. 11 illustrates one exemplary method of providing a template based messaging system in accordance with the invention.

Turning now to FIG. 11, illustrated therein is one embodiment of a method for completing a message service message within a portable electronic device (300) having a display (307) and user interface (304) in accordance with the invention. At step 1101, a partially completed message service message (601) is presented to the user on the display (307). The partially completed message service message (601) includes a plurality of tab accessible fields (604,605,606, 607).

At decision 1102, a navigation application (312) monitors for a tab key (306) actuation from the user interface (304). Similarly, at decision (1103), a data entry application (313) monitors for a data entry key (305) actuation from the user interface (304).

Upon detecting a tab key (306) actuation, the navigation application (312) moves a cursor (608) to one of the plurality of tab accessible fields (604,605,606,607) at step 1104. As noted above, the cursor (608) may move sequentially from tab accessible field to tab accessible field. It may alternatively move to specific tab accessible fields. The navigation application (312) determines whether specific movement is enabled at decision 1105. The navigation application (312) determines to which tab accessible field to jump at decision 1106, and then jumps there at step 1107. Said differently, the navigation application (312) monitors for a particular tab key associated with a particular tab accessible field at decision 1106, and upon detection of the particular tab key, the navigation application (312) moves the cursor (608) to the particular tab accessible field at step 1107.

Upon detecting a data entry key (305) actuation, the data entry application (313) populates one of the tab accessible fields (604,605,606,607) at step 1108. The system may monitor whether all tab accessible fields (604,605,606,607) have been populated at decision 1109. Note that all tab accessible fields (604,605,606,607) need not be populated, however, for a message to be complete. For example, unpopulated tab accessible fields (604,605,606,607) may be simply left blank. Where one or more of the tab accessible fields (604,605,606, 607) is populated, the partially completed message service message (601) becomes a populated message service message (801). The delivery application (317) then delivers the populated message service message (801) to a destination at step 1110.

Note that the partially completed message service message (601) need not be disposed within the message service template database (311). In one embodiment of the invention, the partially completed message service message may be received from a remote host. By way of example, where a user desires to order a product with the portable electronic device (300), a vendor may transmit a partially completed message service message to the portable electronic device (300). Upon receipt, the user may populate the tab accessible fields and return the populated message service message.

Figure 12:
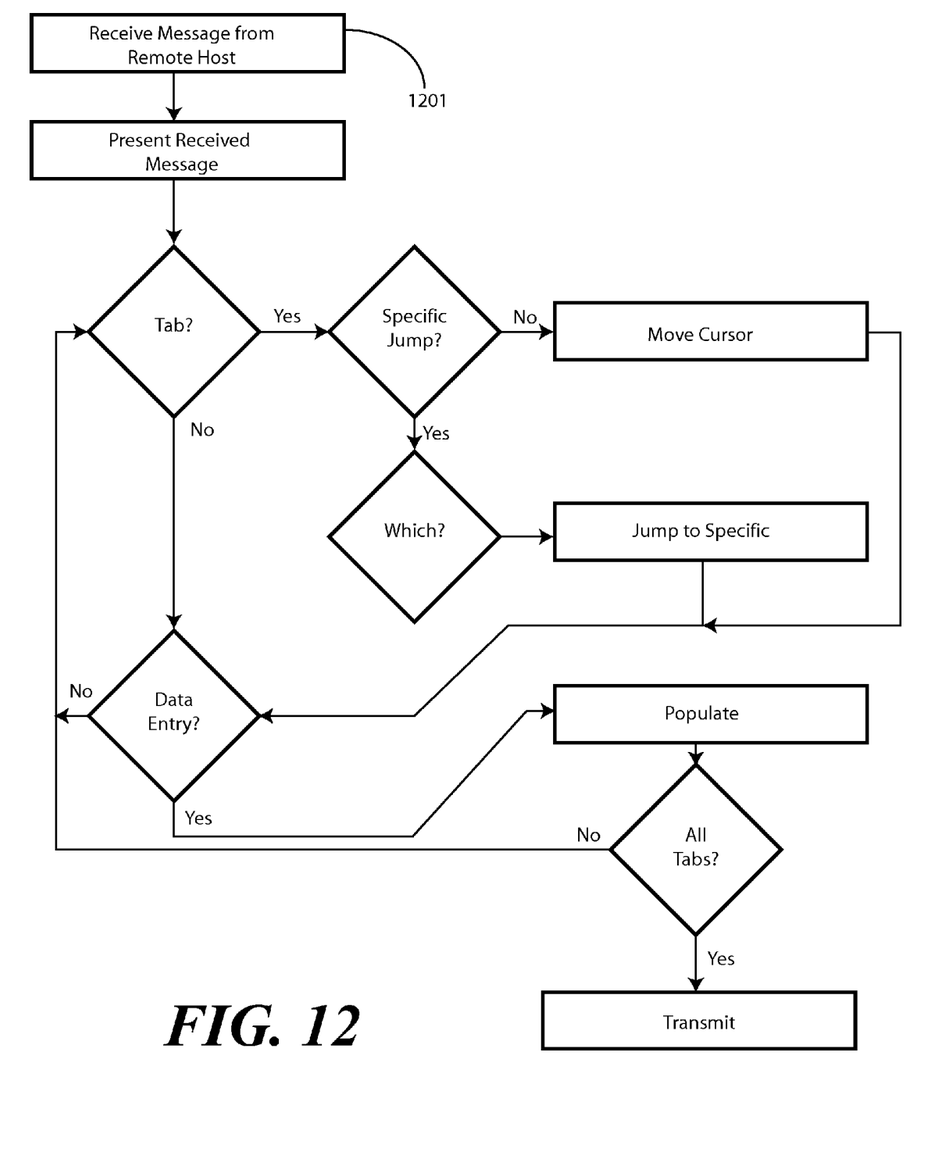
FIG. 12 illustrates another exemplary method of providing a template based messaging system in accordance with the invention.

Turning now to FIG. 12, illustrated therein is such a method for completing a partially completed message service message when received from a remote host. The method is similar to that of FIG. 11, save the source of the partially completed message service message. Rather than retrieving the partially completed message service message from within the portable electronic device (300), the message is received from a remote host. At step 1201, the partially completed message is received. The remainder of steps in FIG. 12 is similar to those of FIG. 11.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A portable electronic device configured to send and receive message service messages, the portable electronic device comprising:
   a. a processor and associated memory;
   b. a message service application operable with the processor, the message service application being configured to provide a partially completed message service message to a user, the partially completed message service message comprising a plurality of populated segments and a plurality of tab accessible fields interlaced among the plurality of populated segments; and
   c. a user interface comprising at least one data entry key and at least one tab key;
   wherein upon actuation of the at least one tab key, the message service application accesses one of the plurality of tab accessible fields.

2. The portable electronic device of claim 1, wherein the plurality of tab accessible fields are initially unpopulated.

3. The portable electronic device of claim 1, wherein the message service application accesses the one of the plurality of tab accessible fields by causing a cursor to move to the one of the plurality of tab accessible fields.

4. The portable electronic device of claim 3, wherein the message service application accesses each of the plurality of tab accessible fields sequentially, such that upon actuation of the at least one tab key, the message service application causes the cursor to move from a first tab accessible field to a second tab accessible field.

5. The portable electronic device of claim 3, wherein upon actuation of the at least one data entry key, the message service application populates the one of the plurality of tab accessible fields.

6. The portable electronic device of claim 5, wherein the message service application populates the one of the plurality of tab accessible fields with one of text, pictures, audio content, and video content.

7. The portable electronic device of claim 3, wherein the user interface comprises a plurality of tab keys corresponding to the plurality of tab accessible fields, such that upon actuation of a first tab key, the message service application causes the cursor to move to a first tab accessible field corresponding to the first tab key.

8. The portable electronic device of claim 1, wherein the plurality of populated segments comprises message sections populated with at least one of text, pictures, audio content, and video content.

9. The portable electronic device of claim 1, wherein the user interface further comprises an insert key, wherein upon actuation of the insert key, the message service application retrieves an object from the associated memory and inserts the object into the one of the plurality of tab accessible fields.

10. The portable electronic device of claim 9, wherein the object is one of a picture, a sound file, a video file, and a predetermined text segment.

11. The portable electronic device of claim 10, wherein the portable electronic device comprises a mobile telephone, wherein the message service application comprises one of a short message service application, a multimedia message service application, and instant messaging application and an e-mail messaging service application.

12. A message service application operable with a portable electronic device having at least a display and a user interface, the message service application comprising:
   a. a message service template database having one or more partially completed message service messages stored therein, the one or more partially completed message service messages each comprising a plurality of populated segments and a plurality of tab accessible fields interlaced among the plurality of populated segments;
   b. a presentation application, the presentation application being configured, upon receipt of input from the user interface, to retrieve a selected partially completed message service message from the message service template database and to present the selected partially completed message service message on the display;
   c. a navigation application responsive to tab commands received from the user interface, wherein upon receipt of a tab command, the navigation application causes a cursor to move to one of the plurality of tab accessible fields; and
   d. a data entry application responsive to data commands received from the user interface, wherein upon receipt of a data command, the data entry application populates the one of the plurality of tab accessible fields to create a populated message service message.

13. The message service application of claim 12, wherein the portable electronic device further comprises a communication circuit, the message service application further comprising a delivery application responsive to the user interface, wherein upon at least one of the plurality of tab accessible fields being populated and a send command being received from the user interface, the delivery application delivers the populated message service message to the communication circuit.

14. The message service application of claim 12, wherein the one or more partially completed message service messages comprise one or more of a short message service message, a multimedia message service message, an instant message service message, and an electronic mail message.

15. The message service application of claim 12, wherein the data entry application comprises a data retrieval module, wherein upon receipt of an insert command from the user interface, the data retrieval module retrieves an object disposed within the portable electronic device and inserts the object into the one of the plurality of tab accessible fields.

16. A method of completing a message service message within a portable electronic device having a display and a user interface, the method comprising the steps of:
   a. presenting a partially completed message service message comprising a plurality of tab accessible fields on the display;
   b. monitoring for one of a tab key actuation from the user interface and a data entry key actuation from the user interface;
   c. upon detecting the tab key actuation, moving a cursor to one of the plurality of tab accessible fields; and
   d. upon detection of the data entry key actuation, populating the one of the plurality of tab accessible fields.

17. The method of claim 16, wherein upon population of one or more of the plurality of tab accessible fields the partially completed message service message becomes a populated message service message, further comprising the step of transmitting the populated message service message to a destination.

18. The method of claim 16, further comprising the step of receiving the partially completed message service message from a remote host.

19. The method of claim 16, wherein the step of monitoring for a tab key actuation from the user interface comprises monitoring for a particular tab key associated with a particular tab accessible field, and, upon detection of actuation of the particular tab key, moving the cursor to the particular tab accessible field.

20. The method of claim 16, wherein the partially completed message service message comprises one of a short message service message, a multimedia message service message, an instant message service message and an electronic mail message.

* * * * *